United States Patent
Hui et al.

(10) Patent No.: US 9,904,665 B2
(45) Date of Patent: Feb. 27, 2018

(54) PARTIAL RASTERIZATION OF WEB PAGE TILES

(71) Applicant: Qualcomm Innovation Center, Inc., San Diego, CA (US)

(72) Inventors: Shiu Wai Hui, Richmond Hill (CA); Yida Wang, North York (CA); Veluppillai Arulesan, Toronto (CA)

(73) Assignee: QUALCOMM Innovation Center, Inc., San Diego, CA (US)

( * ) Notice: Subject to any disclaimer, the term of this patent is extended or adjusted under 35 U.S.C. 154(b) by 221 days.

(21) Appl. No.: 14/884,635

(22) Filed: Oct. 15, 2015

(65) Prior Publication Data

US 2016/0110323 A1 Apr. 21, 2016

Related U.S. Application Data

(60) Provisional application No. 62/064,031, filed on Oct. 15, 2014.

(51) Int. Cl.
*G06F 17/00* (2006.01)
*G06F 17/22* (2006.01)
*G06T 1/60* (2006.01)
*G09G 5/393* (2006.01)
*G09G 5/395* (2006.01)

(52) U.S. Cl.
CPC ...... *G06F 17/2247* (2013.01); *G06F 17/2211* (2013.01); *G06T 1/60* (2013.01); *G09G 5/393* (2013.01); *G09G 5/395* (2013.01); *G09G 2360/122* (2013.01)

(58) Field of Classification Search
CPC .... G06T 1/60; G09G 2360/122; G09G 5/393; G09G 5/395
See application file for complete search history.

(56) References Cited

U.S. PATENT DOCUMENTS

| | | | |
|---|---|---|---|
| 2005/0225556 A1* | 10/2005 | Booth, Jr. | G09G 5/395 345/537 |
| 2009/0033670 A1* | 2/2009 | Hochmuth | G06F 3/1454 345/545 |
| 2012/0268480 A1* | 10/2012 | Cooksey | G06T 1/60 345/619 |
| 2013/0321455 A1* | 12/2013 | Fink | G06T 15/503 345/629 |

* cited by examiner

*Primary Examiner* — Amelia Tapp
*Assistant Examiner* — Barbara Level
(74) *Attorney, Agent, or Firm* — Neugeboren ODowd PC

(57) ABSTRACT

A method and device for rasterizing content includes partitioning a webpage into webpage tiles that are associated with a front buffer and a back buffer. A rasterized version of each of the tiles may be stored in the associated front buffer, and each may include new content. If a previous copy of the at least one tile is found in memory, the new content is rasterized onto the previous copy. If a previous copy is not found, and if the proportion of the new content of the at least one tile is less than a threshold, the new content is rasterized onto the front buffer. If the proportion of the new content is above the threshold, and if unchanged content in the at least one tile is complex, then the unchanged content is copied to the back buffer and the new content is rasterized onto the associated back buffer.

20 Claims, 11 Drawing Sheets

PARTIAL RASTERIZATION OF WEB PAGE TILES

CLAIM OF PRIORITY UNDER 35 U.S.C. §119

The present Application for Patent claims priority to Provisional Application No. 62/064,031 entitled "PARTIAL RASTERIZATION OF WEB PAGE TILES" filed Oct. 15, 2014, and assigned to the assignee hereof and hereby expressly incorporated by reference herein.

FIELD OF THE DISCLOSURE

The present invention relates to content display devices. In particular, but not by way of limitation, the present invention relates to apparatus and methods for improving the display of content on content display devices.

BACKGROUND

Content display devices such as smartphones, netbooks, gaming devices, PDAs, desktop computers, televisions, and laptop computers are now ubiquitous. And these devices now very commonly include hardware that provides network connectively to web servers and software (e.g., web browsers) that provide an interface for users to request and view content from these web servers.

Some of the content that is provided by these web servers, and displayed on these content display devices, constantly changes, or updates to reflect new content while other content remains unchanged. For example, it is very common for a variety of content associated with a webpage to include banners with rotating images or new text, while the rest of the webpage maintains the same general content and layout. Most webpage content is scrolled by a user using a mouse, a touchscreen, or a scroll bar in order to view webpage content that is not displayed at the top of the webpage. Common and ongoing issues with the display of this type of content are maintaining the quality of a user's experience as webpage content gets updated and/or scrolled, while managing limited resources.

More specifically, users have become accustomed to viewing changing content, as well as scrolled content, in a smooth, fast, and uninterrupted manner. Although content display devices continue to be produced with more and more advanced graphics processing resources, these resources are still not fast enough to provide seamless, uninterrupted scrolling, and/or these advanced content display devices demand more and more power, which is often limited. As a consequence, current devices are often less than desirable and will almost certainly be unacceptable in the future.

SUMMARY

One aspect of the disclosure provides a method for rasterizing content for display on a content display device, the method may comprise partitioning a webpage into a plurality of webpage tiles, each of the plurality associated with a front buffer and a back buffer, the front and back buffers allocated in memory, a rasterized version of each of the plurality of tiles stored in the associated front buffer, and at least one of the plurality of tiles including new content. Then, if a previous copy of the at least one tile is found in memory, the method may further comprise rasterizing the portion of the tile that includes the new content onto the previous copy. If a previous copy is not found, and if the proportion of the new content of the at least one tile is less than a threshold, the method may then comprise rasterizing the new content onto the front buffer associated with the at least one tile. If the proportion of the new content is above the threshold, and if unchanged content in the at least one tile is complex, then the method may comprise copying the unchanged content to the associated back buffer and rasterizing the new content onto the associated back buffer.

Another aspect of the disclosure provides a content display device comprising a display configured to display rasterized content and a central processing unit configured to partition webpages into a plurality of webpage tiles and to find previous copies of the plurality. The device may further comprise a memory configured to store a front buffer and a back buffer associated with each of the plurality of webpage tiles, a rasterized version of each of the plurality of tiles stored in an associated front buffer, and at least one of the plurality of tiles including new content. The device may also comprise a rasterizer configured to rasterize, if a previous copy of the at least one of the plurality of tiles is found by the central processing unit in the memory, the portion of the tile that includes new content onto the previous copy. The device may further comprise a tile analysis component configured to determine, if a pervious copy is not found, whether new content on one or more of the plurality of webpage tiles exceeds a threshold. The device may also comprise a rasterization analysis component configured to determine, if the new content exceeds the threshold, whether unchanged content is complex to rasterize. If the proportion of the new content of the at least one tile is less than the threshold, then the rasterizer rasterizes the new content onto the front buffer associated with the at least one tile. If the unchanged content in the at least one tile is complex, then the central processing unit copies the unchanged content to the associated back buffer and the rasterizer rasterizes the new content onto the associated back buffer.

Another aspect of the disclosure provides a non-transitory, computer readable storage medium, encoded with processor readable instructions to perform a method for rasterizing content for display on a content display device. The method may comprise partitioning a webpage into a plurality of webpage tiles, each of the plurality associated with a front buffer and a back buffer, the front and back buffers allocated in memory, a rasterized version of each of the plurality of tiles stored in the associated front buffer, and at least one of the plurality of tiles including new content. Then, if a previous copy of the at least one tile is found in memory, the method may further comprise rasterizing the portion of the tile that includes the new content onto the previous copy. If a previous copy is not found, and if the proportion of the new content of the at least one tile is less than a threshold, the method may then comprise rasterizing the new content onto the front buffer associated with the at least one tile. If the proportion of the new content is above the threshold, and if unchanged content in the at least one tile is complex, then the method may comprise copying the unchanged content to the associated back buffer and rasterizing the new content onto the associated back buffer.

BRIEF DESCRIPTION OF THE DRAWINGS

A more complete appreciation of aspects of the disclosure and many of the attendant advantages thereof will be readily obtained by reference to the following detailed description when considered in connection with the accompanying drawings. These drawings are presented solely for illustration and not limitation of the disclosure.

DETAILED DESCRIPTION

Figure 1:
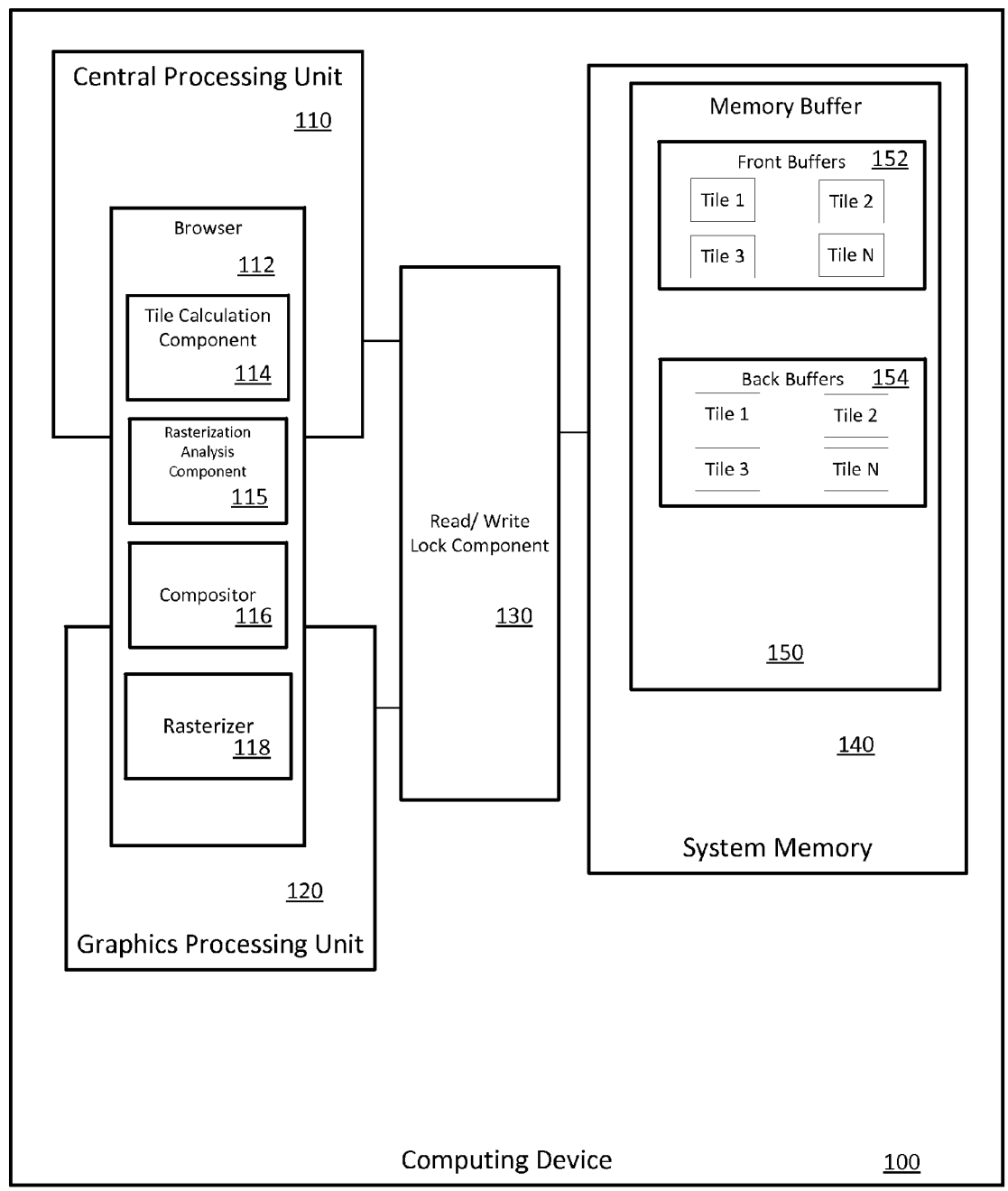
FIG. 1 is a logical block diagram depicting a computing device and the processing and memory components thereof that may implement aspects of the present disclosure.

Various aspects are disclosed in the following description and related drawings to show specific examples relating to embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the field of computer graphics, graphics processing units are used in conjunction with central processing units in order to display high-quality images onto a screen. One common technique that is employed in rendering web pages is partitioning the pages into rectangular tiles. There are several reasons why it is useful to partition web pages into tiles. One reason is that web pages often have certain sections with very simple images to display, such as one solid color over a particular area, and other sections with more complex images, such as photos, videos, or animation. By dividing a web page into tiles, a CPU and GPU together can save processing resources by determining that certain tiles can remain constant over time while other tiles should be changed. Another reason that tiles are used is to efficiently achieve the effect of smooth scrolling over a large webpage, as will be described in further detail later in this disclosure.

FIG. 1 is a logical block diagram of a computing device depicting components that may be used to implement aspects of the present disclosure. The diagram in FIG. 1 is intended to be logical only, depicting components that may be implemented in hardware, firmware, software in combination with hardware, or software alone. It should not be construed to be a hardware diagram. As shown, FIG. 1 shows a computing device 100 containing a central processing unit (CPU) 100, a graphics processing unit (GPU) 120 and a system memory 140. A browser 112 may be implemented by a combination of the CPU 110 and the GPU 120. The browser 112 itself may have several components, including a tile calculation component 114, a rasterization analysis component 115, a compositor 116, and a rasterizer 118, which will be discussed in further detail later in this disclosure. Additionally, the computing device 100 may contain a read/write lock component 130, which may be used by the CPU 110 and the GPU 120 to lock portions of the system 140 for read-only, write-only, or for both read-and-write access according to aspects of the disclosure. The system memory 140 may comprise a memory buffer 150, which comprises front buffers 152 and back buffers 154. Each of the front buffers 152 and 154 may contain multiple buffers, including one buffer for each partitioned tile. The buffers for each tile will be described in further detail later in this disclosure.

There are several ways that a webpage can be rendered onto a screen. A webpage is essentially a set of instructions and commands that tell a browser what kinds of webpage objects to draw and where to draw them in relation to a display and to one another. A rasterizer (e.g., rasterizer 118) in the browser, running on the CPU and/or GPU, translates those commands and determines how each pixel on a display screen of the device is going to display the various objects by creating bitmaps. In some systems, the browser may rasterize the webpage onto the display directly, meaning that the rasterization (i.e., creation of the bitmaps) and the shading of the pixels take place simultaneously. This method of rasterizing bitmaps directly onto the display can be efficient in some cases, but can cause performance issues when it comes to two common features of webpages: updating and scrolling. Any updates to a page would require re-rasterization of the whole page, and any scrolling would require the same. Performance issues such as delays in the page appearing on a screen are common with this method.

In some cases, a more efficient way to display a webpage is to first rasterize the page onto a buffer. A buffer can be thought of as memory that is allocated for storing rasterized bitmap images. Then, from the buffer, a compositor (e.g., the compositor 116) in the browser can access the rasterized bitmaps and composite (i.e., place) them on the display. Rasterizing "onto" a buffer indicates that allocated memory is being written to. Compositing "from" a buffer indicates that that allocated memory is being read from. Typically, the same buffer cannot be written to and read from at the same time. This method of rasterizing, buffering, and compositing enhances the performance of scrolling dramatically as compared to rasterizing on the display directly. Scrolling performance is enhanced because the rasterized bitmaps in the buffer do not have to be re-rasterized whenever the user scrolls the webpage down to show more of the webpage. Instead, rasterized bitmaps stored in the buffer are just re-compo sited over and over again in slightly different positions. That is, any one rasterized portion of bitmaps, such as one sectioned into a tile, may first be composited onto one set of pixels, and as the user scrolls down, the tile is just re-composited over and over onto slightly higher sets of pixels on the display until the whole tile disappears from the display. In essence, the rasterized bitmaps are accessed over and over as textures by the compositor.

It is common for webpages to have much more content—and be much longer—than the initial section that is displayed on a screen. Most computing devices do not have, or do not allocate, enough memory to rasterize the entire webpage, because to do so may be a waste of processing and memory resources. For example, if a page is ten times as long as the top section that is initially displayed in a browser window, it may not be practical to rasterize and buffer the entire webpage. Instead, many computing devices will rasterize and buffer just the top visible section and perhaps a portion of the section immediately below the visible section. If the user scrolls farther down than the section that has been rasterized and buffered, then the rest of the webpage will be rasterized, buffered, and composited as needed. However, rasterizing is typically a slower process than compositing, particularly when the webpage content is complex. In order to rasterize a portion of a webpage during scrolling, many browsers utilize a "front buffer" and a "back buffer" in order to allow rasterization of one portion to be carried out while compositing of another portion is simultaneously occurring, and to make up for the fact that rasterization is slower. The front buffer stores bitmaps that have already been rasterized and are being accessed for composition (i.e., the front buffer is being read in order to display what is currently supposed to be on the display).

As an example, a particular content display device may be programmed to initially rasterize and buffer the top portion of any particular website and the second portion immediately below that top portion that is the same size as the display screen. That is, the webpage content that is automatically rasterized and buffered for any particular webpage on this device would be about double the size of the display. In this example, the size of an actual webpage accessed by a user may be ten times as long as the display screen. Therefore, the top 20% of the webpage would be initially rasterized in the front buffer, and the bottom 80% of the webpage would not be rasterized unless the user scrolled to view any part of the bottom 80%.

While the user scrolls down through the first 20% that has been rasterized, the front buffer is being read to composite rasterized bitmaps onto the display in varying locations to achieve smooth scrolling. As the user approaches the bottom 80% that is not rasterized yet, the back buffer simultaneously gets used to rasterize bitmaps that have yet to be rasterized (i.e., the back buffer is being written). At least two buffers are needed because the same buffer cannot be used for reading and writing at the same time. The use of a front and a back buffer is known as "double buffering." When the rasterization of the portion of the bottom 80% of the webpage that is about to be viewed is completed on the back buffer, the front and back buffer are "swapped" by the CPU 110. Essentially, the rasterized bitmaps that were rasterized on the back buffer become the front buffer, so the newly rasterized bitmaps may be read and composited once they are swapped to the front buffer. This may be accomplished by switching pointers in the CPU 110 to instruct the CPU which buffers are the front ones and which ones are the back ones. One problem that can occur when scrolling a webpage and utilizing front and back buffers in this manner is that rasterization is a slower process than composition, so if a user scrolls quickly to a portion of the webpage that still needs to be rasterized on the back buffer, the rasterization may not be complete yet, and the display will appear blank. In other words, the front buffer will have composited all the portions it can composite before the rasterization is complete on the back buffer, and the swap will not be synchronized in time to allow the rasterized back buffer bitmaps to be swapped to the front buffer. Another reason the swap cannot be synchronized through this method is because a buffer cannot be read and written at the same time. Therefore, during the time the rasterized bitmaps from the back buffer are being swapped, they cannot be read and composited by the compositor, so there is a delay.

Figure 2:
FIG. 2 is a diagram of web page partitioned into tiles, containing some content that is static and other content that may change.

The problem of slow rasterization compared to composition is compounded when a webpage has new or updated content in addition to scrolling. For the purposes of the present disclosure, the terms "new content," "updated content," and "changing content" may be interchangeable. As mentioned previously, a common technique for scrolling efficiently is to partition a display of a particular device into rectangular tiles, and subsequently, to partition any webpages to be rendered onto the display into corresponding rectangular tiles for processing purposes. Tile partitioning is also useful for rendering new or updated content efficiently. FIG. 2 shows a diagram of a webpage 200 divided up into webpage tiles 201-208. The number and size of tiles used on any particular computing device display may vary according to various factors such as the resolution of the display, the processing power, and the memory of the device. For example, a smartphone may have a screen resolution of somewhere around 2048×2048 pixels, and displayed webpages on that screen may be divided up into four tiles that are approximately 512×512 pixels each. A desktop display may contain many more pixels and have more processing power and memory, and may therefore utilize dozens of tiles to display a webpage. In FIG. 2, four tiles, 201, 202, 205, and 206 contain some content. In this diagram and the following simple examples, the word "Title" may represent some text displayed on the webpage that does not change. The word "Content" may represent some text or other kinds of content (e.g., pictures, animations, colors) that are subject to being updated periodically.

Figure 3:
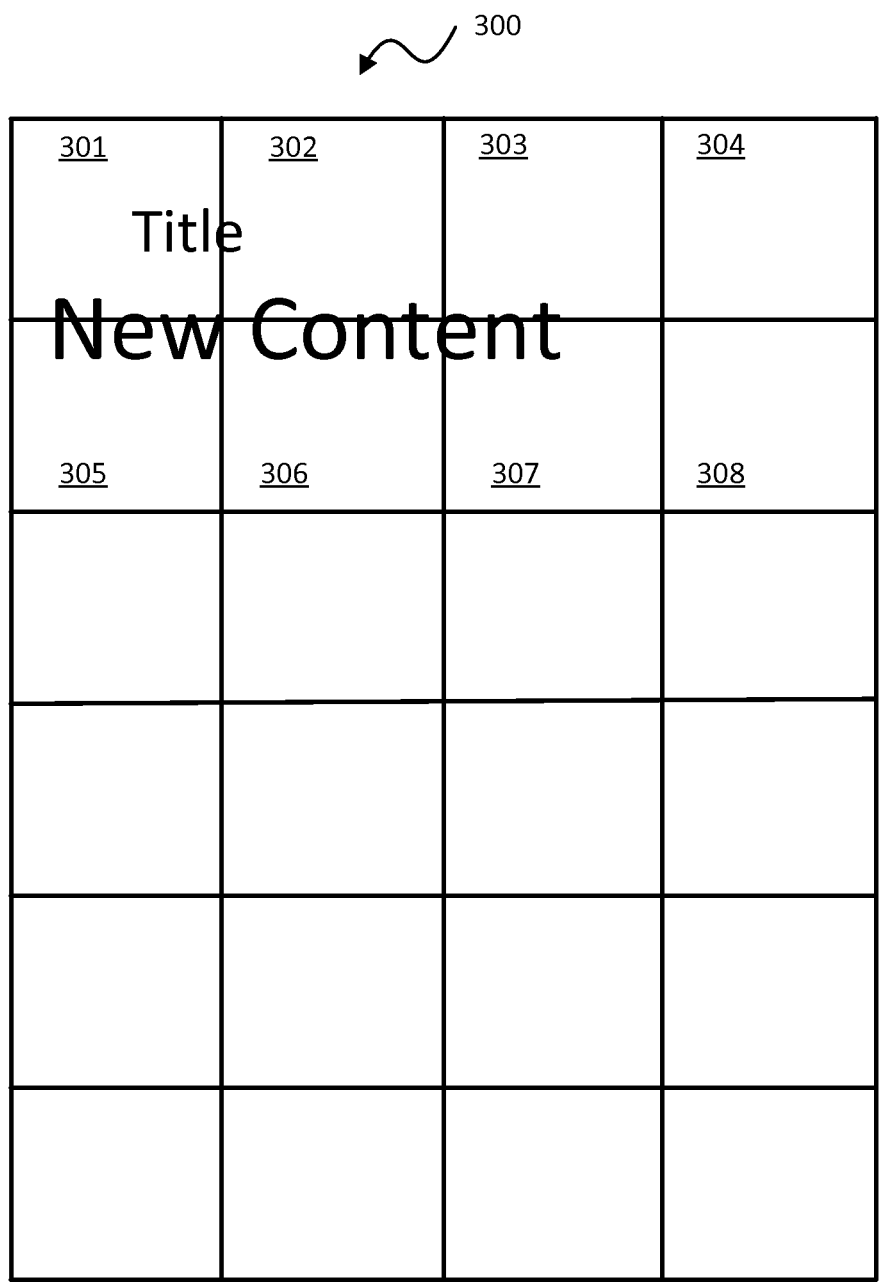
FIG. 3 is a diagram of a web page partitioned into tiles that corresponds to the web page of FIG. 2, but with new content that has been changed.

FIG. 3 shows a webpage 300, which is the same webpage as webpage 200 of FIG. 2, but with a section of new content, as represented by the shaded words "New Content." Typically, webpages are updated when some JavaScript embedded in the webpage initiates an update. One example is when a news website has a banner of top headlines represented by images and text, and the banner changes every few seconds to show other headlines. This kind of update may update a fairly large section of a display. The same news website may also update a stock market banner by changing some small text numbers periodically. A blog post or social media post may have a time associated with the post, where the post itself, comprising images and text, remains the same, but the time associated changes every minute to reflect how long ago it was updated. These kinds of social media updates to text may only comprise a very small section of a display.

Figure 4:
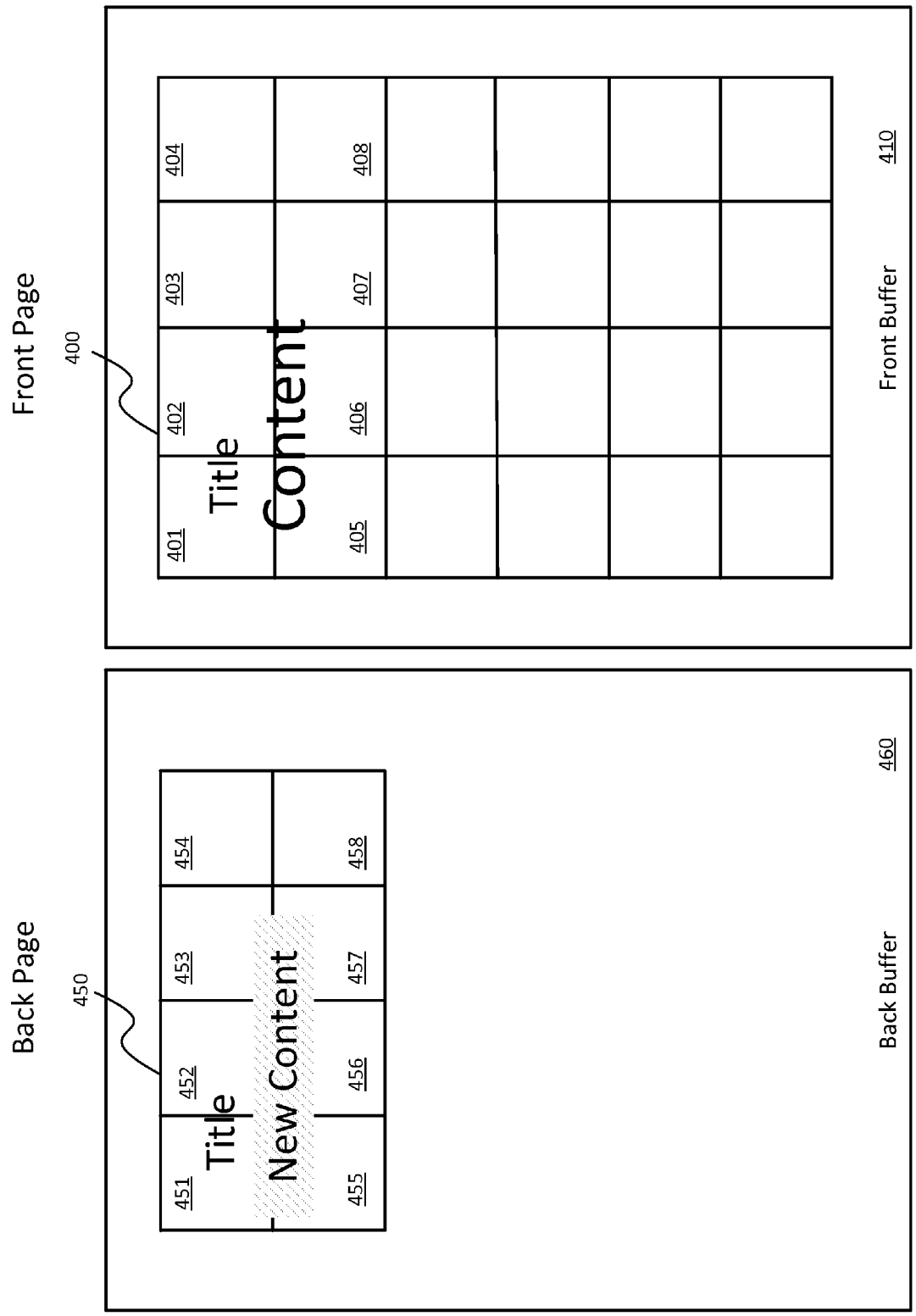
FIG. 4 is a diagram of a web page being composited on a front buffer while tiles for new content of a web page are being rasterized on a back buffer.

An aspect of the present disclosure is that tiles can be analyzed individually to determine the most efficient way to rasterize and/or composite them. Another aspect is that separate buffers can be allocated to each individual tile. Yet another aspect is that these buffers can be locked in response to the analysis at particular times in order to reduce the need for re-rasterization. FIGS. 4-8 will be described with simultaneous reference to FIG. 1 in order to identify the components that can implement the various aspects of the disclosure. FIG. 4 shows how double buffering typically works. A webpage 400 may be referred to as a front page 400 to indicate that it is the version of the webpage that is currently being displayed. The front page may be rasterized on, or composited from, the front buffer 410, which is memory allocated for those particular purposes. The front page 400 may be divided up into multiple tiles, and contain the initial content to be displayed on the webpage, which includes the "Title" and "Content" located in tiles 401-407. When a part of the page needs to be updated (e.g., a JavaScript runs and instructs the webpage to update certain content), the tiles containing the new content may be re-rasterized. The page with the updated content may be referred to as a back page 450 to indicate that it is the version of the page that will be displayed next. The rasterization of the back page 450 may take place on a back buffer 460.

Figure 5:
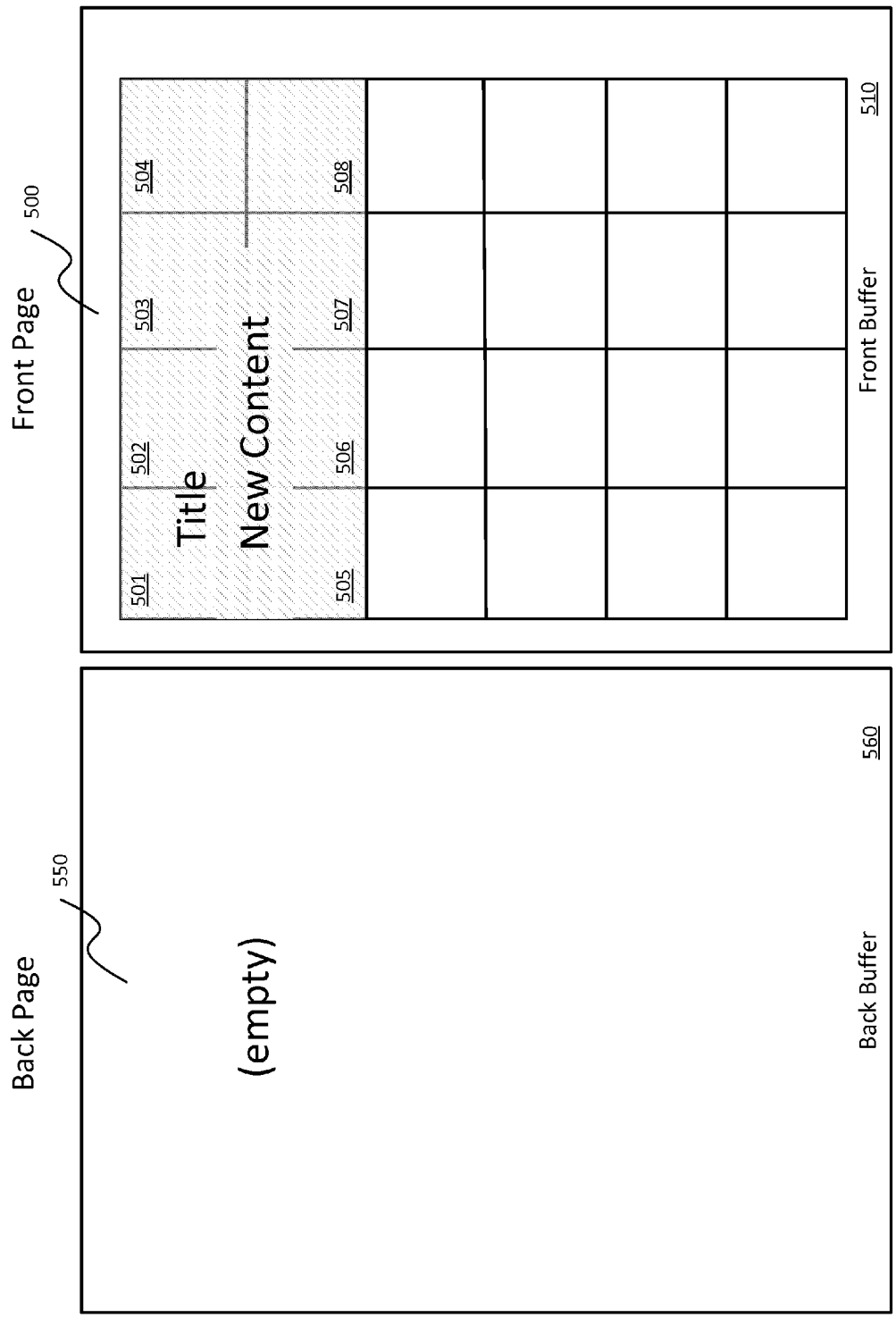
FIG. 5 is a diagram of web page tiles with new content being composited onto a front buffer after swapping with the back buffer on which it has been rasterized.

FIG. 5 illustrates what happens when the back page 450 from FIG. 4 is done being rasterized. The compositor 116 may swap the back page 450 from the back buffer 460. FIG. 5 shows after this swap has taken place. The former back page is now the front page 500, is located on the front buffer 510, and can now be composited, and therefore displayed, on the display. In FIG. 5, the back buffer 560 is depicted as empty because there is not currently any new content that needs to be updated. Referring back to FIG. 4, the back page 450 shows the words "New Content" as shaded to depict that the only part of the webpage that is actually changing are the words "New Content." However, because part of the new content is located in each of the tiles 451-458, each whole tile has to be re-rasterized. In FIG. 5, all the tiles that are re-rasterized (501-508) and now located on the front buffer 510, are depicted as completely shaded, in order to represent that they have been completely re-rasterized.

Figure 6:
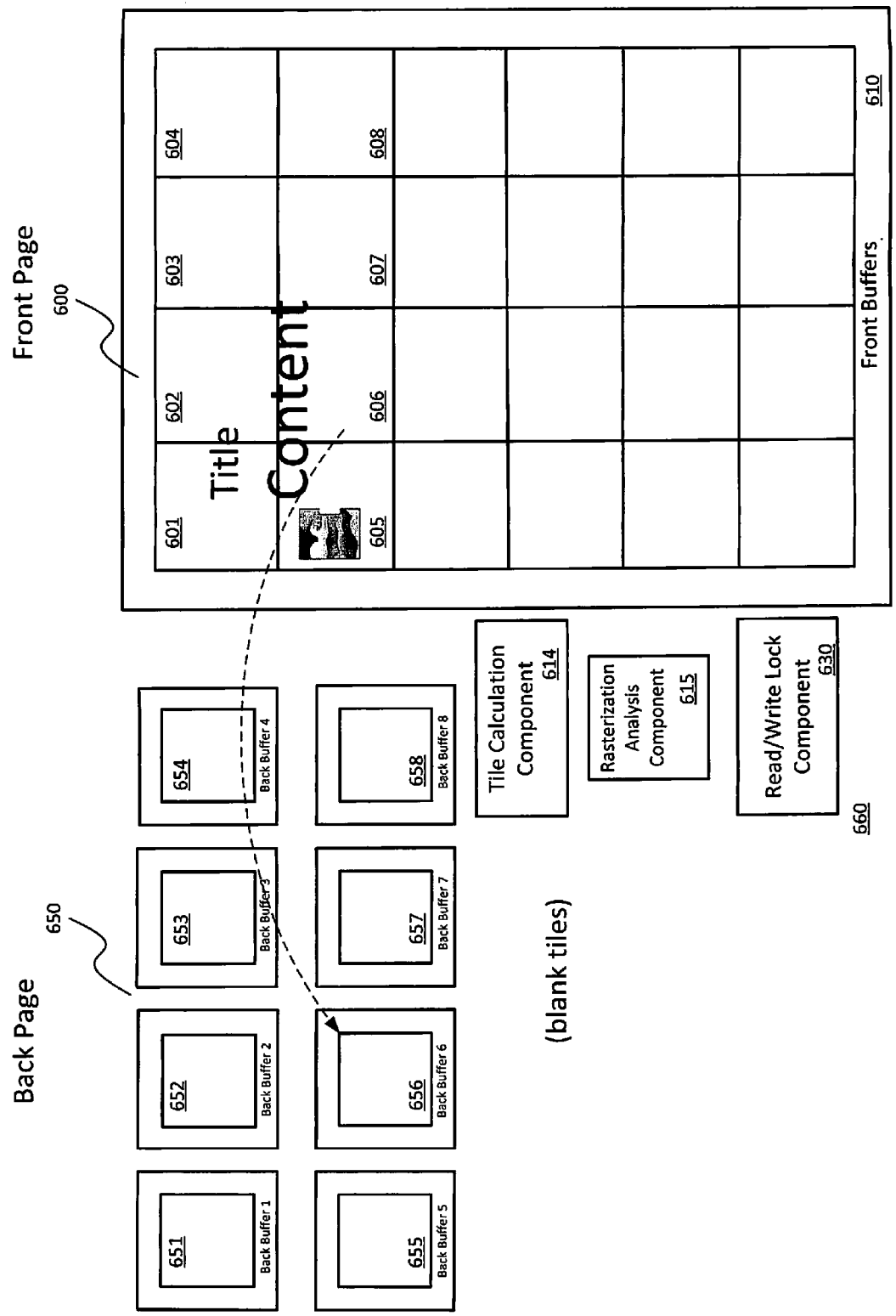
FIG. 6 is a diagram of web page tiles with front buffers and back buffers individually allocated for each tile.

Aspects of the present disclosure pertain to reducing the need for each entire tile to be rasterized if it is not necessary. FIG. 6 shows one aspect of the disclosure in which the front and back buffer are actually separated out into multiple front and back buffers, one for each tile. When back page tiles need to be generated (i.e., rasterized) in anticipation of new updated content, blank tiles on back buffers are allocated and are ready to be utilized in one of several ways. As shown in FIG. 1, the browser of the present disclosure 112 comprises a tile calculation component 114. This tile calculation component, represented in FIG. 6 as tile calculation component 614, analyzes the content of each tile that is currently being composited on the front buffer and compares it to what the next updated tile should look like in order to see how much updated content will comprise the new tile. Because the calculation or analysis may be achieved in a variety of ways, the tile calculation component may alternatively be referred to as a "tile analysis component." The analysis is possible because the browser 112 and the tile calculation component 114 can tell which parts of the web page are changing by identifying new drawing commands.

Figure 8:
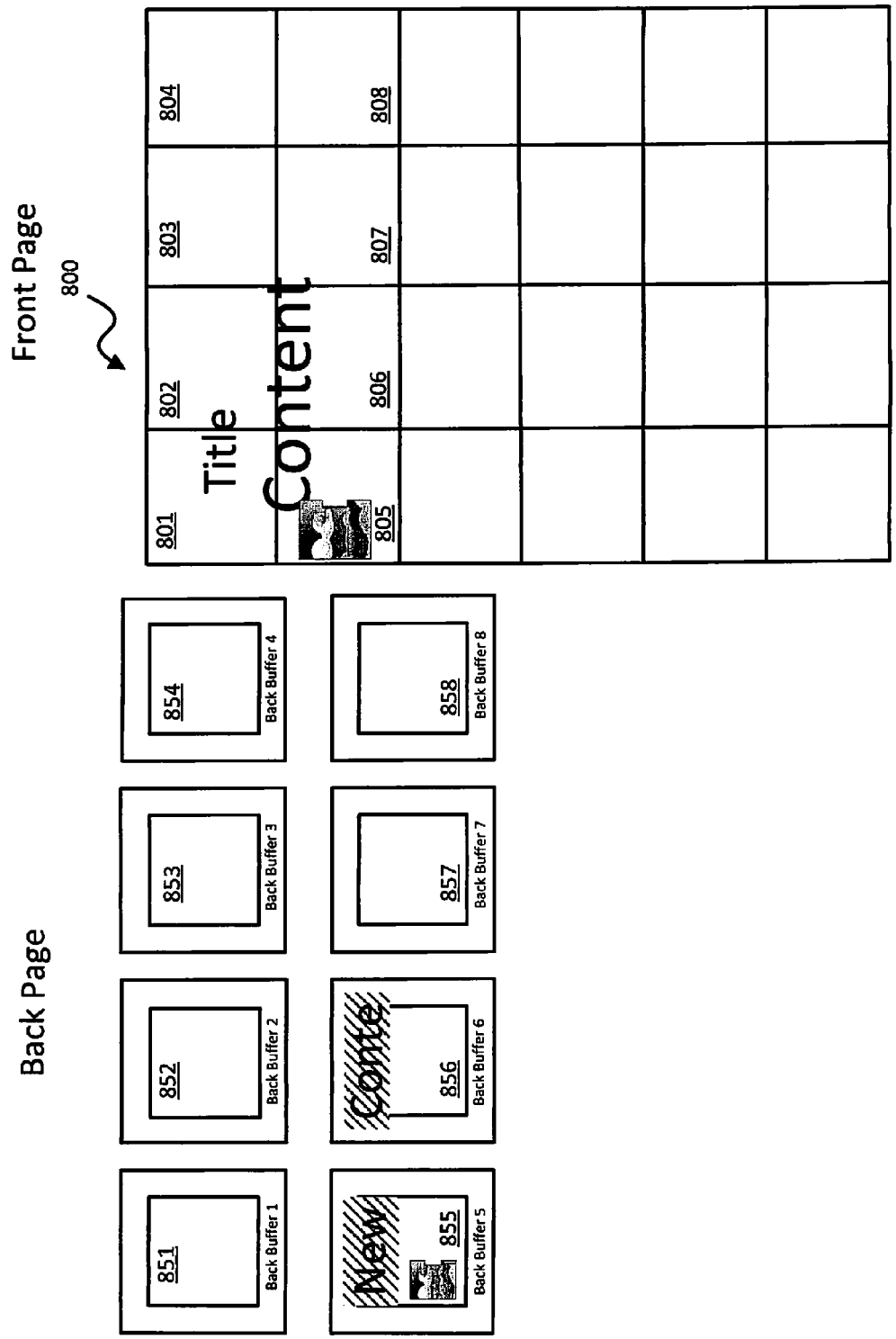
FIG. 8 is a diagram showing how tiles of varying content may be rasterized and buffered differently using buffers that are individually allocated for each tile.

The tile calculation component 614 may calculate the new content as a percentage of a particular tile, which allows other components of the system to take different actions in response. In a first scenario, the tile calculation component 614 may determine that the amount of content that is to be updated is below a particular threshold percentage of the overall area of the tile. This threshold percentage may vary widely from device to device, and may be dependent on factors including the processing and memory capability of the device. In some devices, the percentage threshold may be between 1% and 10%. In other devices, it may be up to 25% for example. Embodiments of this disclosure may include other percentage thresholds. If, for example, a particular tile, such as tile 602 on the front buffer, were to be analyzed and compared to the new content that would need to be on the updated version of the tile, such as the words "New Content," as shown in FIG. 8, the tile calculation component 614 would determine that only a small amount of the text of "Content," would need to be updated. In particular, just the tops of the letter "t" would be updated with a slightly different position and configuration of similar text. The rest of the tile 602 would remain unchanged. In this example, the tile calculation component 614 may determine that the percentage of the changing portion of the tile in comparison to the non-changing portion of the tile is less than the threshold.

When the percentage of new content to be updated does not reach the threshold for a particular tile, the read/write lock component 630 may lock the tile on the front buffer for write access. For example, tile 602, which would have new content that is lower than the threshold percentage, would be locked. By doing this, the CPU 110 can rasterize directly onto the front buffer. It may be advantageous to rasterize the small amount of new content directly onto the front buffer when doing so will be fast enough to prevent any stalls in the display. Rasterizing new content directly onto the front buffer may be faster than rasterizing it on a back buffer and then swapping it to the front for composition. This method may be especially advantageous when the only changing content is a small amount of text on a complex, feature-rich webpage. For example, if a social media site with many photos and descriptions mostly remains unchanged, but updates a section that says "this was posted 5 minutes ago" to "this was posted 6 minutes ago" and so on, every minute, direct rasterization of the "5" and "6" may greatly reduce unnecessary re-rasterization. As a result, GPU synchronization stalls, which result from delays in re-rasterization on a back buffer, may also be reduced, improving the user's experience of viewing such a webpage while scrolling.

A second possible result of the calculation by the tile calculation component 614 is that the changing content may be above the threshold percentage. In such a case, an additional analysis may be performed to determine the makeup of the non-changing area of the tile. This analysis may be performed by a rasterization analysis component 615 (which may be implemented by rasterization analysis component 115 of FIG. 1) to see if the non-changing area is made up of content that is simple or complex to rasterize. The rasterization analysis component 615 may analyze the drawing commands that must be executed to display the non-changing area in order to determine whether that non-changing area is simple or complex. Simple content may include, for example, drawing commands for a blank area or a solid color. Complex content may comprise, for example, drawing commands for a bitmap, text, complex paths, or anything else that is relatively complex to rasterize. An example of a tile with changing content over the threshold percentage, but with simple non-changing content is depicted in tile 606. A large section of the word "Content" will be changed, but the rest of the tile is blank, and therefore simple. In contrast, tile 605 has a large section of the word "Content" that will be changed, but it also has a complex image to rasterize.

An aspect of the disclosure is that for tiles with a large area of changing content with simple non-changing content (e.g., tile 606), the corresponding back buffer for that tile will be used to re-rasterize the entire changing tile. For tiles with a large area of changing content with complex non-changing content, though, the front buffer for that particular tile will be locked for read-only access by the read/write lock component 630. This locking is done in order to make a copy of the entire, previously rasterized content of the tile that already exists on the front buffer. It may be advantageous to copy such a tile that has complex non-changing content rather than to re-rasterize it, because copying may conserve processing resources. The CPU 110 then copies the existing front tile onto the corresponding new back tile, which has been allocated for this purpose. As shown in FIG. 6, tile 605 which has complex non-changing content, will be locked for read-only access by the CPU 110.

Figure 7:
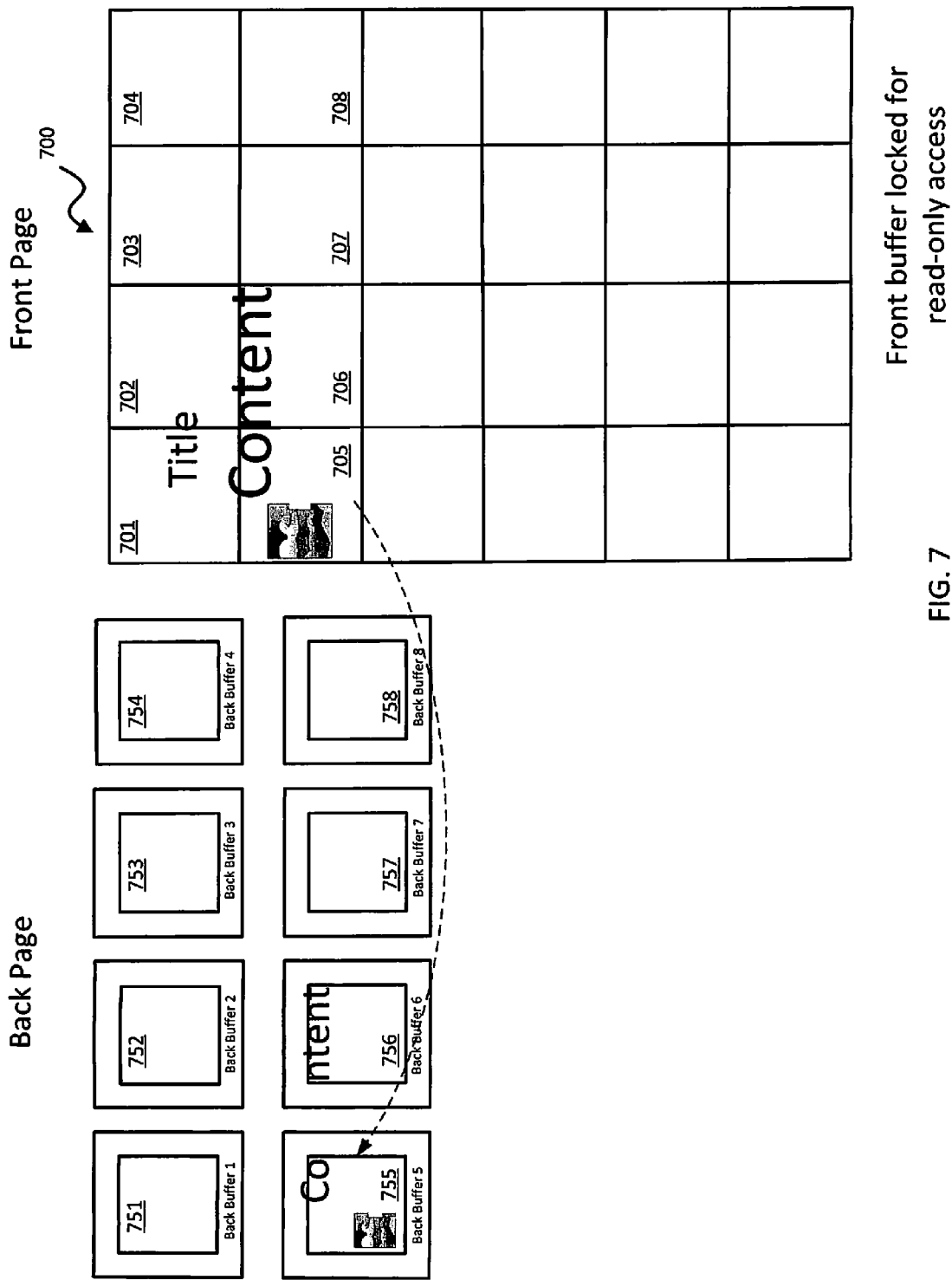
FIG. 7 is a diagram showing how a front buffer may be locked for read-only access and the contents of a tile are copied.

FIG. 7 shows tile 705, which corresponds to tile 605 from FIG. 6, being copied by the CPU 705 onto the back buffer 755. When the CPU 110 makes this copy, it is essentially utilizing the rasterized bitmap from a front buffer as a texture, which consumes less processing power than re-rasterizing a complex image completely. Another advantage to locking the front buffer tile (e.g., tile 705) for read-only access is that the GPU can simultaneously access the read-only front buffer tiles (e.g., tile 705) for compositing. Because both accesses are read-only, there are no race conditions between the CPU and the GPU. That is, neither the CPU nor the GPU have to wait for one to finish reading so the other can write to the same buffer, or vice versa. This aspect especially saves processing resources when a particular tile is both updating and being scrolled at the same time.

Once the front buffer tile 705 is copied onto the back buffer tile 755, the CPU may then rasterize only the newly updated content on the back buffer tile 755, so that the non-changing content is not needlessly re-rasterized. For example, the text "Co" on back buffer 755 would be re-rasterized into the text "New," as shown in FIG. 8 in back buffer 855. FIG. 8 shows how the various front and back buffers are used differently based on the different types of content in each tile. Tile 802 contains only a small area of changing content (i.e., the tops of the letter "t"), which is lower than the percentage threshold in comparison to the non-changing content. Therefore, tile 802 is ideally suited for rasterization directly on the front buffer, and back buffer 852 is not used for re-rasterization. The updated content that will replace the tops of the letter "t" will be rasterized directly only the front buffer 802, which can happen quickly once the front buffer is made available for write access. Tile 806 contains a large amount of changing content, larger than the percentage threshold, but the non-changing area of tile 806 is simple. Therefore, the entire tile is ideally suited to be re-rasterized on back buffer 856. Tile 806 may still be locked by the compositor 116 for read access (via the read/write lock component 130), although tile 806 may not be locked by the rasterizer 118 (via the read/write lock component 130). It should be noted that tiles may be locked for read access by multiple components at the same time, such as by the compositor 116 and the rasterizer 118. However, only one component may lock a tile for write access at a time. While the front buffer 806 is in read-only access mode, it is still available for compositing. Tile 855 contains a large amount of changing content, as well as complex non-changing content. Therefore, front buffer 805 is ideally suited to be locked for read-only access, which allows it to be copied to the back buffer 855, and still allows front buffer 805 to be used for compositing. Because the front buffer tile 805 is still in read-only access mode, the front buffer tile 805 is still available for compositing (and therefore, for scrolling) by the GPU. Tiles 856 and 855 can be rasterized quickly because no complex content is being re-rasterized. That is, tile 856 only re-rasterizes new changing content and simple non-changing content, and tile 855 only re-rasterizes changing content and is not required to re-rasterize the complex non-changing content (because it has been copied). Once all the re-rasterization is done on the back buffer tiles, all write access to the back buffers are unlocked by the read/write lock component 130. The front buffer tiles may be locked for write access at this time as well, if the compositor 116 is using them for composition. Once the swap occurs, the back buffer tiles that have been re-rasterized become the front buffer tiles, and there are no locks on them until the compositor 116 locks them for read access later during composition. At this time, the former back tiles 855 and 856 can be accessed for compositing because they have replaced front buffers 805 and 806. Tile 802 remains a front buffer and is not swapped, and its content can be rasterized directly onto tile 802.

Figure 9:
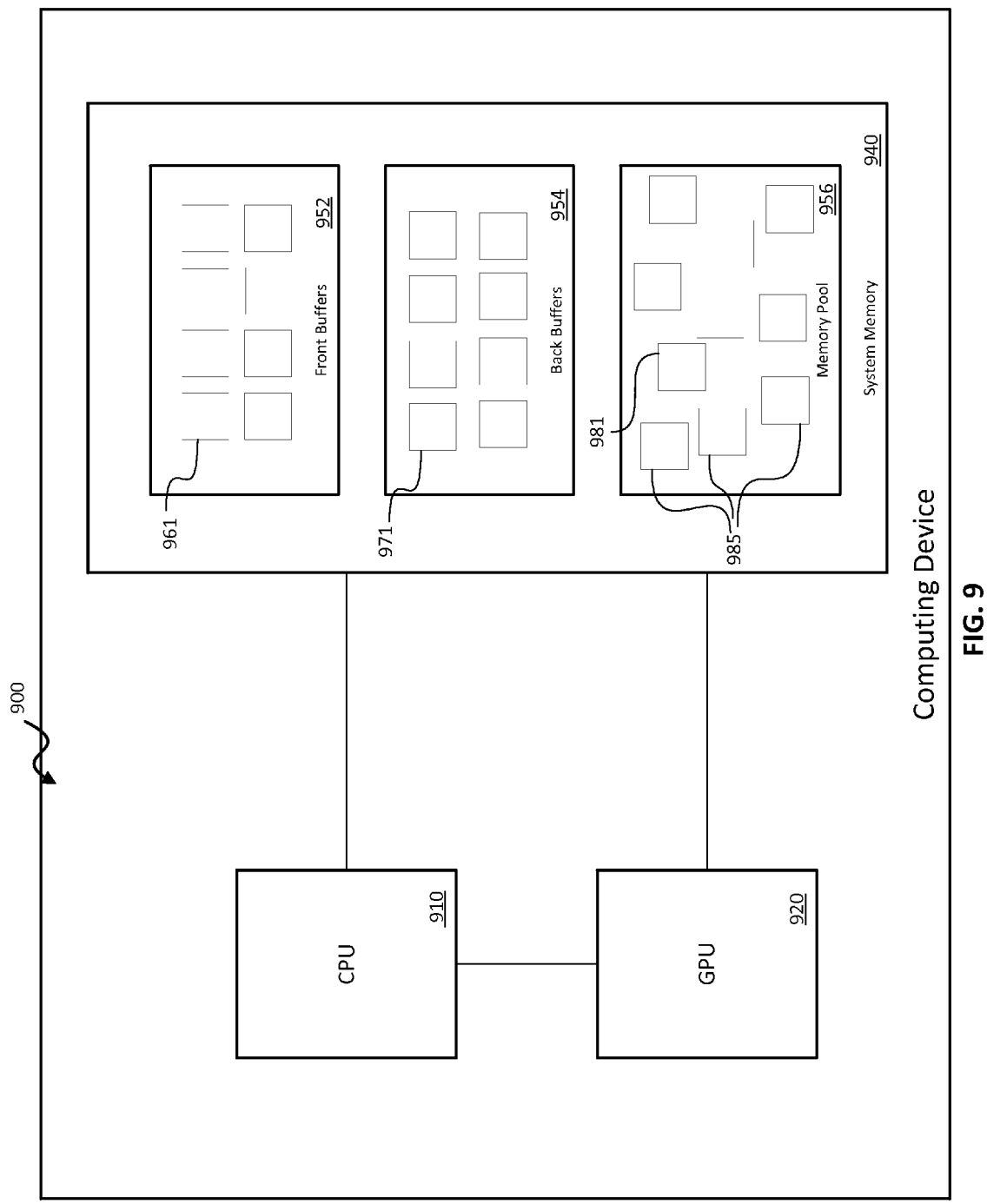
FIG. 9 is a diagram showing how previous copies of tiles to be rasterized may be accessed in a memory pool of previously allocated buffers.

The scenarios described with reference to FIGS. 6, 7, and 8 may all be implemented in instances where a first version of a webpage is rasterized and subsequently composited onto the front buffers for the first time, and then a second version with some changing content is subsequently rasterized and composited onto the front buffer according to the methods described in FIGS. 6, 7, and 8. They may also be implemented to rasterize all subsequent versions (e.g., third, fourth, and any additional versions) of a webpage. An additional aspect of the disclosure may be implemented once the webpage changes from the second version to a third version, and to additional versions beyond that. FIG. 9 shows a computing device 900, which may correspond to the computing device 100 of FIG. 1, though certain components are omitted in FIG. 9 for clarity. FIG. 9 shows that the system memory 940 contains front buffers 952 and back buffers 954. The front buffers 952 may contain the tiles for the version of the webpage that is currently being composited, and the back buffers 954 may be allocated for rasterizing and/or copying from the front tiles as necessary, according to the methods described in FIGS. 6, 7, and 8. However, in FIG. 9, a version of the webpage with content that has changed has been re-rasterized at least once already, meaning that some buffers in memory had previously been allocated as either a front buffer or back buffer at least once before. These previously allocated buffers 981 may still be available in a memory pool 956.

It is contemplated that some of the previously allocated buffers 981 may contain content that is very similar to the content that needs to be rasterized onto a front buffer for a particular third, fourth, or subsequent version of a webpage. That is, a particular tile to be rasterized on a front buffer may have a previous copy of that particular tile that was previously rasterized on the front buffer, and the previous copy may still be available in the memory pool 956, if it has not yet been erased and/or overwritten. The term "previous copy," as it relates to a particular tile, refers to a previously allocated buffer that has been used for the particular tile at least once before. For example, In FIG. 9, the particular tile that is to be rasterized and/or composited to front buffer 961 has a corresponding back buffer 971, which has been allocated in case it needs to be used for rasterizing the next version of the particular tile according to the methods described in FIGS. 6, 7, and 8. As previously mentioned, FIG. 9 shows a scenario in which the current front buffer 961 is not the first or second version of the particular tile, but rather a third or greater version. Therefore, there may be a previous copy of the tile to that is about to be rasterized to the front buffer 961. In FIG. 9, that previous copy is depicted as previously allocated buffer 981.

In methods according to the present disclosure, the CPU 910 may first look to the memory pool 956 to determine if there is a previous copy that corresponds to a particular tile that is about to be rasterized. It is contemplated that the previous copy (e.g., previously allocated buffer 981) may not contain content that is one hundred percent similar to the particular tile that is to be rasterized to the front buffer 961. That is, the particular tile may have some content that is changed in relation to the previous copy. However, if a previous copy does exist, it may be advantageous to use the previous copy on the previously allocated buffer and just re-rasterize the changing portion onto it. The CPU 910 may be able to easily locate previous copies of tiles corresponding to front buffers because each tile may be directionally linked to its front buffer. Additionally, it is contemplated that the CPU 910 will not need to lock any of the previously allocated buffer, but rather just keeps track of them.

Once the new content of a particular has been rasterized onto the previous copy, the previous copy (i.e., the previously allocated buffer 981) may be swapped to be the front buffer. This method may save processing resources, even in comparison to the methods described in FIGS. 6, 7, and 8. Therefore, the method of the present disclosure may include first looking to see if there is a previous copy of a particular tile to be rasterized, and if so, rasterizing only the new content onto the previous copy and then swapping it to the front buffer. If there is no previous copy available, then the front buffer may then be rasterized according to the methods described in FIGS. 6, 7, and 8. There are several reasons why a previous copy of a particular tile may not be available. For example, a previous copy will not be available if the webpage tile is being rasterized for the first or second time. Additionally, if memory resources are needed for other purposes, a previous copy may be overwritten and used for some other memory requirements. Previous copies are less likely to be available if a user is interacting with a webpage, for example.

Figure 10:
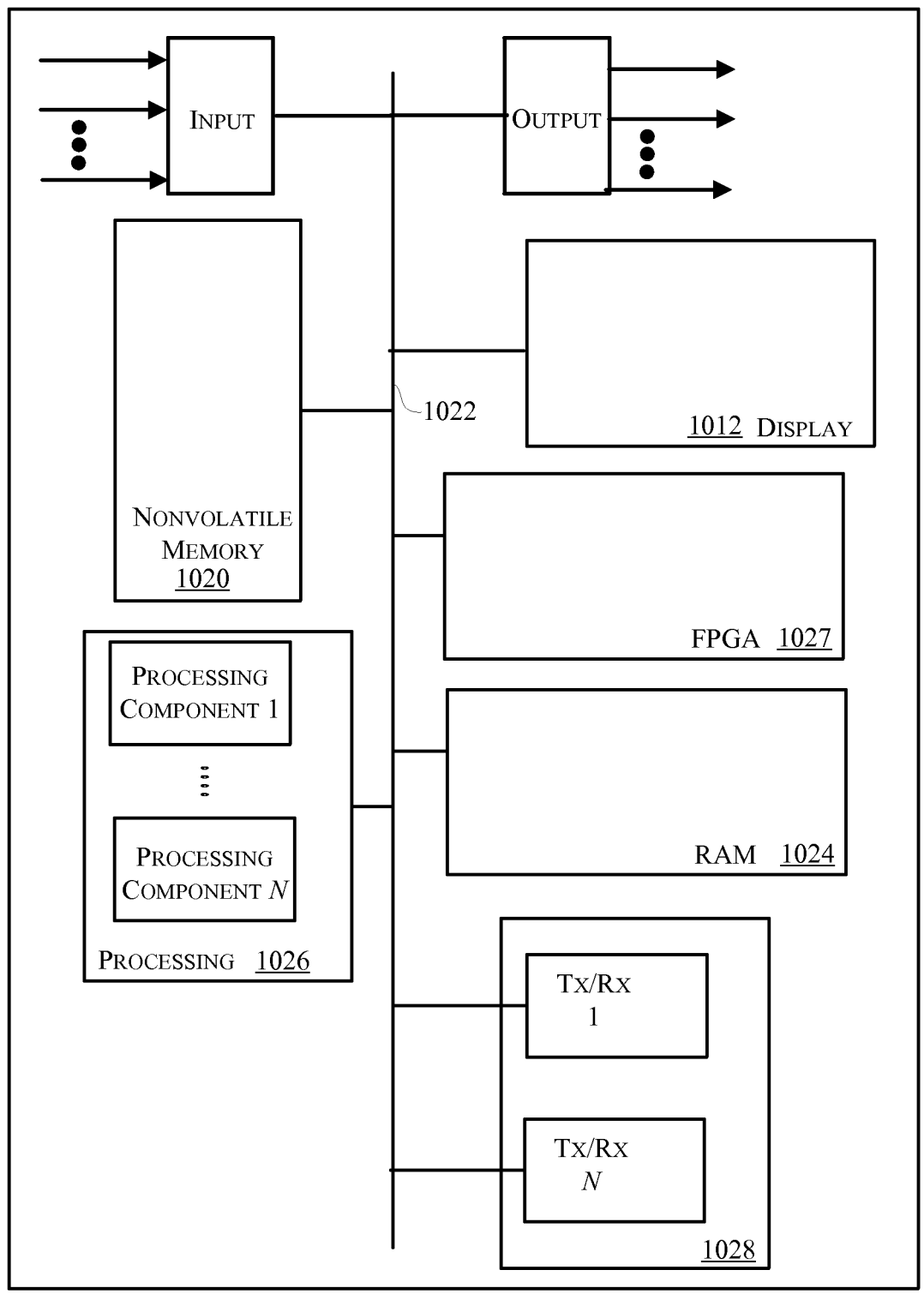
FIG. 10 is a diagram showing hardware components of a computing device that may implement aspects of the disclosure.

Referring next to FIG. 10, shown is a block diagram depicting physical components that may be utilized to realize one or more aspects of the embodiments disclosed herein. As shown, in this embodiment a display portion 1012 and nonvolatile memory 1020 are coupled to a bus 1022 that is also coupled to random access memory ("RAM") 1024, a processing portion (which includes N processing components) 1026, a field programmable gate array (FPGA) 1027, and a transceiver component 1028 that includes N transceivers. Although the components depicted in FIG. 10 represent physical components, FIG. 10 is not intended to be a detailed hardware diagram; thus many of the components depicted in FIG. 10 may be realized by common constructs or distributed among additional physical components. Moreover, it is contemplated that other existing and yet-to-be developed physical components and architectures may be utilized to implement the functional components described with reference to FIG. 10.

This display 1012 generally operates to provide a user interface for a user. The display 1012 may be realized, for example, by an LCD or AMOLED display, and in several implementations, the display 1012 is realized by a touchscreen display. The display 1012 may be utilized to realize, in part, a user interface provided by the browser 112. In general, the nonvolatile memory 1020 is non-transitory memory that functions to store (e.g., persistently store) data and processor executable code (including executable code that is associated with effectuating the methods described herein). In some embodiments for example, the nonvolatile memory 1020 includes bootloader code, operating system code, file system code, and non-transistory processor-executable code to facilitate the execution of the methods described herein including the method described with reference to FIG. 11. Moreover, the non-volatile memory may be utilized to realize the system memory 140 described with reference to FIG. 1.

In many implementations, the nonvolatile memory 1020 is realized by flash memory (e.g., NAND or ONENAND memory), but it is contemplated that other memory types may be utilized as well. Although it may be possible to execute the code from the nonvolatile memory 1020, the executable code in the nonvolatile memory is typically loaded into RAM 1024 and executed by one or more of the N processing components in the processing portion 1026.

The N processing components in connection with RAM 1024 generally operate to execute the instructions stored in nonvolatile memory 1020 to enable the loading and rendering of webpages and form data associated with such webpages. For example, non-transitory processor-executable instructions to effectuate the methods described with reference to FIG. 11 may be persistently stored in nonvolatile memory 1020 and executed by the N processing components in connection with RAM 1024. As one of ordinarily skill in the art will appreciate, the processing portion 1026 may include a video processor, digital signal processor (DSP), graphics processing unit (GPU), such as the GPU 120 in FIG. 1, and other processing components.

In addition, or in the alternative, the FPGA 1027 may be configured to effectuate one or more aspects of the methodologies described herein (e.g., the methods described with reference to FIG. 11). For example, non-transitory FPGA-configuration-instructions may be persistently stored in nonvolatile memory 1020 and accessed by the FPGA 1027 (e.g., during boot up) to configure the FPGA 1027 to effectuate functions of one or more of the components depicted in FIG. 1 including the tile calculation component 114, the rasterization analysis component 115, the compositor 116, or the rasterizer 118.

The depicted transceiver component 1028 includes N transceiver chains, which may be used for communicating with external devices via wireless or wireline networks. Each of the N transceiver chains may represent a transceiver associated with a particular communication scheme (e.g., WiFi, CDMA, Bluetooth, NFC, etc.). The transceiver chains may be utilized to request and receive webpages and send form data as described herein.

Figure 11:
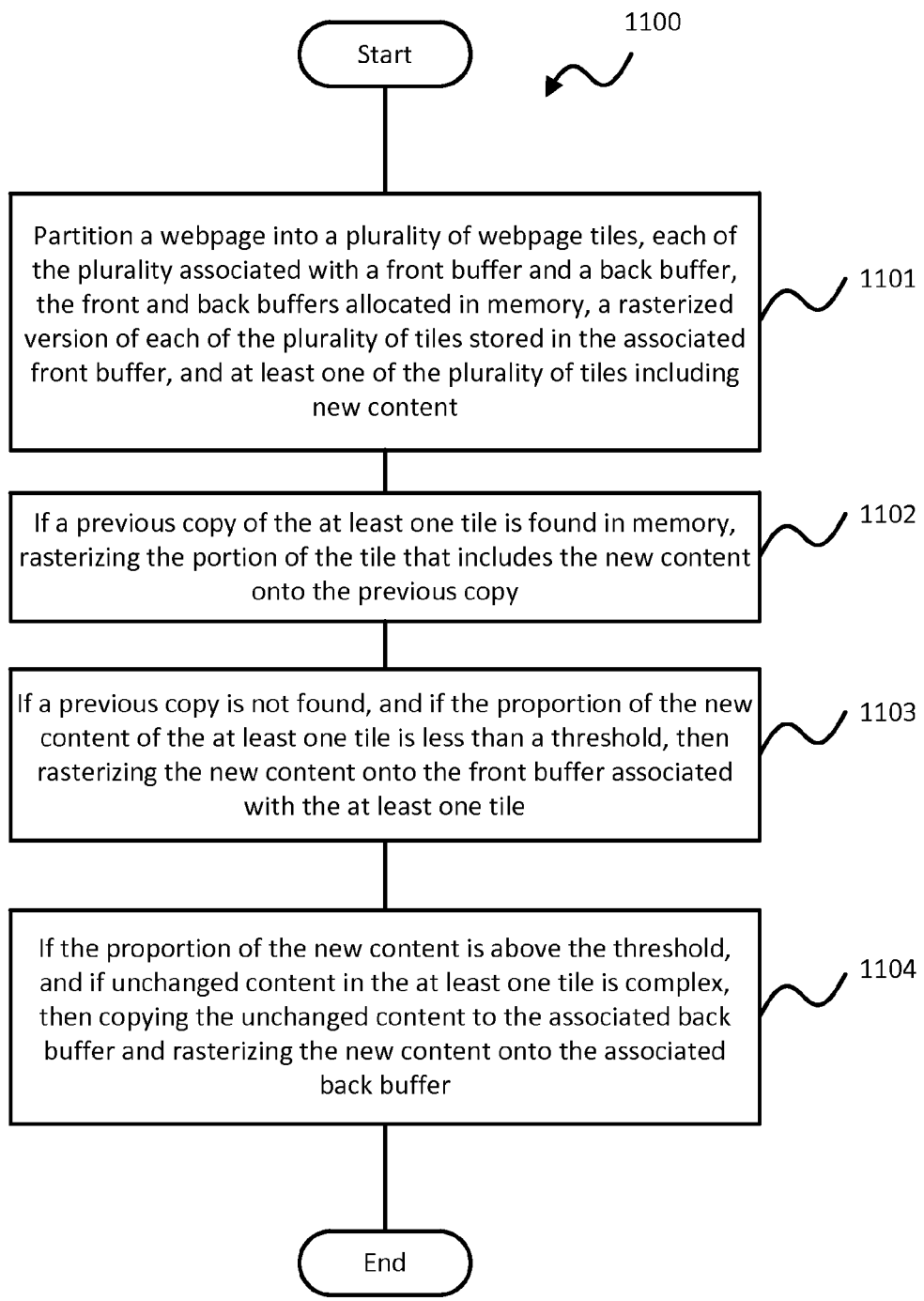
FIG. 11 is a flowchart that may be traversed to depict a method according to embodiments of the present disclosure.

FIG. 11 is a flowchart depicting a method 1100 that may be traversed to implement embodiments of the present disclosure. Simultaneous reference may be made to FIG. 1 to describe components that may implement various steps of the method 1100. The method 1000 may comprise, at 1001, partitioning a webpage into a plurality of webpage tiles, which may be implemented by the CPU 110. Each of the plurality may be associated with a front buffer and a back buffer, the front and back buffers allocated in memory, such as system memory 140. A rasterized version of each of the plurality of tiles may be stored in the associated front buffer, and at least one of the plurality of tiles may include new content. Then, at 1102, the method may include if a previous copy of the at least one tile is found in memory, rasterizing the portion of the tile that includes the new content onto the previous copy. The CPU 110 may look for previous copies of tiles, and the rasterization which may be implemented by the rasterizer 118. Next, at 1003, the method may include, if a previous copy is not found, and if the proportion of the new content of the at least one tile is less than a threshold (as calculated by the tile calculation component 114), rasterizing the new content onto the front buffer associated with the at least one tile. Then, at 1004, the method may include, if the proportion of the new content is above the threshold, and if unchanged content in the at least one tile is complex, (as determined by the rasterization analysis component 115), copying the unchanged content to the associated back buffer and rasterizing the new content onto the associated back buffer.

Those skilled in the art can readily recognize that numerous variations and substitutions may be made in the disclosure, its use and its configuration to achieve substantially the same results as achieved by the embodiments described herein. Accordingly, there is no intention to limit the disclosure to the exemplary forms. Many variations, modifications and alternative constructions fall within the scope and spirit of the disclosure.

What is claimed is:

1. A method of rasterizing content for display on a content display device, the method comprising:
   partitioning a webpage into a plurality of tiles, each of the plurality associated with a front buffer and a back buffer, the front and back buffers allocated in memory, a rasterized version of each of the plurality of tiles stored in the associated front buffer, and at least one of the plurality of tiles including new content;
   analyzing each of the plurality of tiles to determine that each of the plurality of tiles requires one of:
      no new content,
      new content above a threshold proportion, or
      new content below the threshold proportion;
   analyzing at least one of the plurality of tiles for which the new content is above the threshold proportion to determine if rasterization of a non-changing portion of the at least one of the plurality of tiles is simple or complex;
   rendering at least one of the plurality of tiles via a first method wherein a previous copy of any of the plurality of tiles requiring new content above or below the threshold proportion is found in memory and the portion of the at least one tile comprising the new content is rasterized onto the previous copy;
   rendering at least a second one of the plurality of webpage tiles via a second method wherein a previous copy is not found, and the proportion of the new content of the at least one tile is less than the threshold proportion, then rasterizing the new content onto the front buffer associated with the at least one tile; and
   rendering at least a third one of the plurality of webpage tiles via a third method wherein the proportion of the new content is above the threshold and the non-changing content in the at least one tile is complex, by copying the unchanged content to the associated back buffer and rasterizing the new content onto the associated back buffer.

2. The method of claim 1, wherein:
   the new content for a particular tile is below the threshold proportion, and further comprising;
   locking one or more front buffers for write-only access.

3. The method of claim 1, wherein:
   the new content of a particular tile is above the threshold proportion, and the non-changing content in the particular tile is complex, and further comprising;
   locking one or more front buffers for read-only access.

4. The method of claim 1, wherein:
   the new content of a particular tile is above the threshold proportion, and the new content of the particular webpage tile is simple to rasterize, and further comprising:
   locking one or more back buffers for write-only access.

5. The method of claim 4, further comprising:
   re-rasterizing the new content and the non-changing content of the particular tile onto a back buffer corresponding to the particular tile.

6. The method of claim 3, wherein a graphics processing unit accesses front buffer tiles that are locked for read-only access for compositing.

7. A content display device comprising:
   a display;
   a central processing unit, and
   a memory, together configured to execute, via
      a rasterizer,
      a tile analysis component, and
      a rasterization analysis component, a method of rasterizing content for display, the method comprising:
   partitioning a webpage into a plurality of tiles, each of the plurality associated with a front buffer and a back buffer, the front and back buffers allocated in the memory, a rasterized version of each of the plurality of tiles stored in the associated front buffer, and at least one of the plurality of tiles including new content;
   analyzing each of the plurality of tiles to determine that each of the plurality of tiles requires one of:
      no new content,
      new content above a threshold proportion, or
      new content below the threshold proportion;
   analyzing at least one of the plurality of tiles for which the new content is above the threshold proportion to determine if rasterization of a non-changing portion of the at least one of the plurality of tiles is simple or complex;
   rendering at least one of the plurality of tiles via a first method wherein a previous copy of any of the plurality of tiles requiring new content above or below the threshold proportion is found in memory and the portion of the at least one tile comprising the new content is rasterized onto the previous copy;
   rendering at least a second one of the plurality of webpage tiles via a second method wherein a previous copy is not found, and the proportion of the new content of the at least one tile is less than the threshold proportion, then rasterizing the new content onto the front buffer associated with the at least one tile; and
   rendering at least a third one of the plurality of webpage tiles via a third method wherein the proportion of the new content is above the threshold and the non-changing content in the at least one tile is complex, by copying the unchanged content to the associated back buffer and rasterizing the new content onto the associated back buffer.

8. The content display device of claim 7, further comprising:
a read/write lock component to lock one or more front or back buffers for read-only or write-only access in response to the tile analysis component determining whether the new content exceeds the threshold proportion for at least one particular tile.

9. The content display device of claim 8, wherein:
the read/write lock component locks one or more front buffers for write-only access if the new content is below the threshold proportion for the at least one particular tile.

10. The content display device of claim 9, wherein:
the rasterizer rasterizes changing content directly onto at least one front buffer.

11. The content display device of claim 8, wherein:
the tile analysis component calculates that the new content for a particular tile is higher than the threshold proportion,
the rasterization analysis component determines that the new content is complex to rasterize, and
the read/write lock component locks a front buffer corresponding to the particular tile for read-only access.

12. The content display device of claim 11, wherein:
the central processing unit copies all content stored on the front buffer corresponding to the particular tile onto a back buffer corresponding to the particular tile, and
the rasterizer rasterizes the new content of the particular tile onto the back buffer corresponding to the particular tile.

13. The content display device of claim 9, wherein:
the rasterization analysis component analyzes that the new content of the at least one particular tile is simple to rasterize,
the read/write lock component locks the back buffer corresponding to the at least one particular tile for write-only access, and
the rasterizer rasterizes the new content and the non-changing content of the at least one particular tile onto a back buffer corresponding to the at least one particular tile.

14. The content display device of claim 7, wherein:
a compositor accesses one or more front buffers that are locked for read-only access.

15. A non-transitory, tangible computer readable storage medium, encoded with processor readable instructions to perform a method for rasterizing content for display on a content display device, the method comprising:
partitioning a webpage into a plurality of tiles, each of the plurality associated with a front buffer and a back buffer, the front and back buffers allocated in memory, a rasterized version of each of the plurality of tiles stored in the associated front buffer, and at least one of the plurality of tiles including new content;
analyzing each of the plurality of tiles to determine that each of the plurality of tiles requires one of:
no new content,
new content above a threshold proportion, or
new content below the threshold proportion;
analyzing at least one of the plurality of tiles for which the new content is above the threshold proportion to determine if rasterization of a non-changing portion of the at least one of the plurality of tiles is simple or complex;
rendering at least one of the plurality of tiles via a first method wherein a previous copy of any of the plurality of tiles requiring new content above or below the threshold proportion is found in memory and the portion of the at least one tile comprising the new content is rasterized onto the previous copy;
rendering at least a second one of the plurality of webpage tiles via a second method wherein a previous copy is not found, and the proportion of the new content of the at least one tile is less than the threshold proportion, then rasterizing the new content onto the front buffer associated with the at least one tile; and
rendering at least a third one of the plurality of webpage tiles via a third method wherein the proportion of the new content is above the threshold and the non-changing content in the at least one tile is complex, by copying the unchanged content to the associated back buffer and rasterizing the new content onto the associated back buffer.

16. The non-transitory, tangible computer readable storage medium of claim 15, wherein:
the new content for a particular tile is below the threshold proportion, and further comprising;
locking one or more front buffers for write-only access.

17. The non-transitory, tangible computer readable storage medium of claim 15, wherein:
the new content of a particular tile is above the threshold proportion, and the non-changing content in the particular tile is complex, and further comprising;
locking one or more front buffers for read-only access.

18. The non-transitory, tangible computer readable storage medium of claim 15, wherein:
the new content of a particular tile is above the threshold proportion, and the new content of the particular webpage tile is simple to rasterize, and further comprising:
locking one or more back buffers for write-only access.

19. The non-transitory, tangible computer readable storage medium of claim 18, further comprising:
re-rasterizing the new content and the non-changing content of the particular tile onto a back buffer corresponding to the particular tile.

20. The non-transitory, tangible computer readable storage medium of claim 17, wherein a graphics processing unit accesses front buffer tiles that are locked for read-only access for compositing.

* * * * *